2 Sheets--Sheet 1.

G. WILLETT.
Apparatus for Combing and Mixing Tampico and Bristles.

No. 142,427. Patented September 2, 1873.

Witnesses:
A. Benneckendorf.
C. Sagwich

Inventor:
G. Willett
Per Mum
Attorneys.

2 Sheets--Sheet 2.

G. WILLETT.
Apparatus for Combing and Mixing Tampico and Bristles.

No. 142,427. Patented September 2, 1873.

Witnesses:

Inventor:
G. Willett
Per
Attorneys.

UNITED STATES PATENT OFFICE.

GEORGE WILLETT, OF BURLINGTON, ASSIGNOR TO ENOCH B. WHITING, OF ST. ALBANS, VERMONT.

IMPROVEMENT IN APPARATUS FOR COMBING AND MIXING TAMPICO AND BRISTLES.

Specification forming part of Letters Patent No. 142,427, dated September 2, 1873; application filed June 7, 1873.

*To all whom it may concern:*

Be it known that I, GEORGE WILLETT, of Burlington, in the county of Chittenden and State of Vermont, have invented a new and Improved Machine for Combing and Mixing Tampico and Bristles, of which the following is a specification:

My invention consists of movable endless chain-holders, to which the tampico and bristles are carried by endless belt-carriers and so presented to said holders that they project about half their length or more from the side as they are carried slowly along past a comb so arranged and operated that it combs out the projecting portions thus subjected to it. My invention also consists of a combination, in one machine, of two of these movable holders and combs with endless carrier-belts so arranged that they take the partly-combed stock from the first holders and comb, and reverse and transfer it to the second holders so that the uncombed portion is presented to the second comb to be completed by it. The stock is laid on the endless carrier-belts a little in advance of the holders by hand, and spread and mixed as evenly as possible, so that it combs together, and it is run through the machine several times till the mixing and combing are satisfactory.

Figure 1:
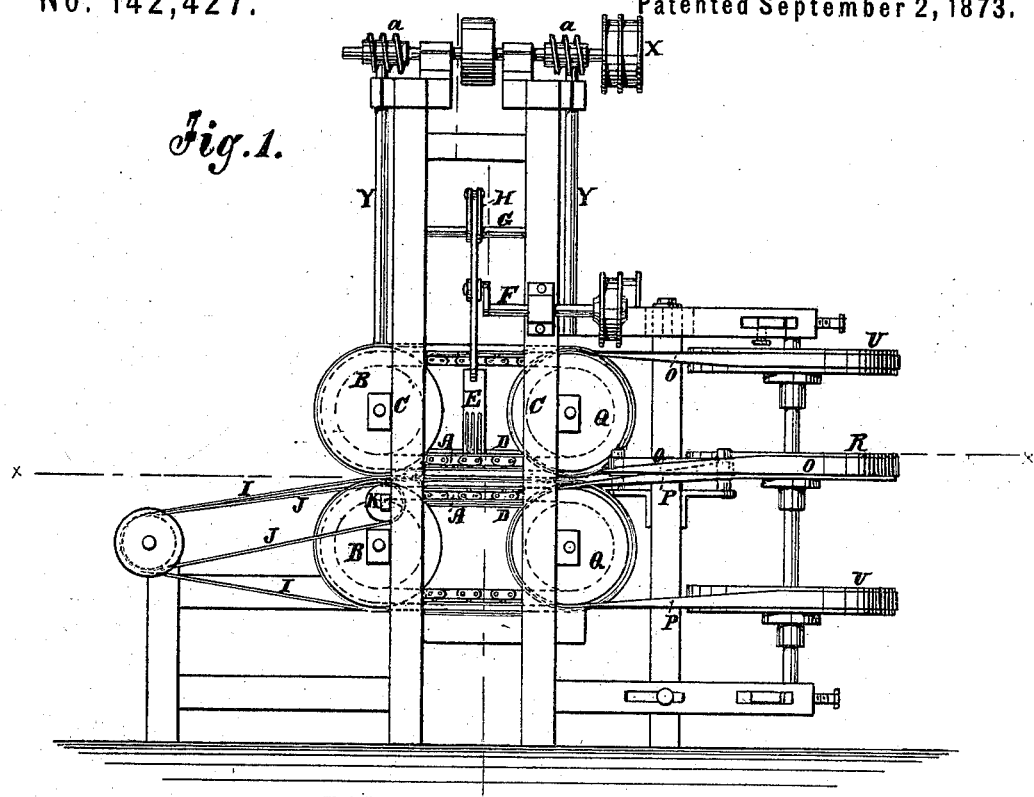
Figure 2:
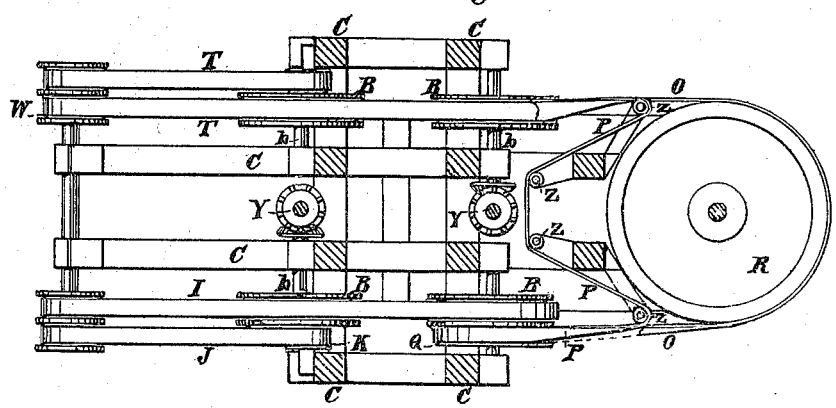
Figure 3:
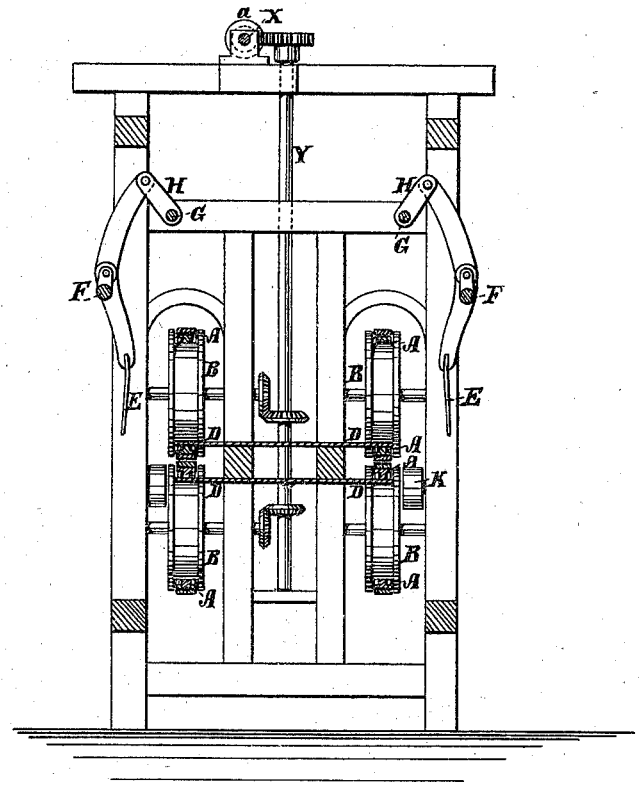

Figure 1 is a side elevation of my improved machine. Fig. 2 is a horizontal section taken on the line $x\ x$ of Fig. 1; and Fig. 3 is a sectional elevation taken on the line $y\ y$ of Fig. 1.

Similar letters of reference indicate corresponding parts.

A represents a pair of endless-chain holders arranged one above another on carrier-pulley B, in any suitable frame, C. Said chains run close together in the same direction and under the control of guides or plates D, which prevent them from being forced apart by the brush-stock which passes between them. E represents a comb, suspended at the front side of these holders at about the middle and actuated by the crank-shaft F, rock-shaft G, and the arms H of the latter, so that it automatically combs out the stock carried past it in the holders and projecting in part from them. I and J represent a couple of endless carrier-belts for feeding the bristles and tampico to the holding-carriers. Together side by side these belts are in width about equal to the length of the stock, which is about three inches (more or less) long, the tampico being cut into short lengths about equal to the length of the bristles with which it is to be mixed. The mixed stock is placed on the carrier-belts I J crosswise, and carried by them to the holders A, between which belt I passes, but belt J only runs over the pulley K; consequently only the portion of stock on belt I passes between the holders, and the other portion projects so as to be acted on by the comb E. After passing the comb the projecting portion of the stock enters between the belts O and P of the transferring and reversing carrier, working over the vertical pulleys Q, which are side by side with the carrier-pulleys B at delivering end of the holder; also horizontal pulleys R and Z, and by them turned so that the uncombed portion projects downward, and in this condition it passes between the large horizontal wheel R and the belt O, around to the other side of the machine, and again between O and P, by which it is turned up to the horizontal position with the uncombed portion projecting outward, and in this position it is presented to the secondary holders A, and by them carried along past the comb E of that side and then delivered to the delivering-carriers T, from which it is taken by hand and transferred to the feeding-carriers again in case it is to be recombed, or put in any receptacle if completed. The transferring-belts O and P work back from the pulleys Q on the side of the machine when the first combing is performed on the large horizontal pulleys U, and from them over the chain-carrier pulleys B of the other side of the machine, and the lower one, P, passes beyond said pulleys over the idle-pulley W, and constitutes a portion of the discharging-carrier T. This transferring and reversing carrier may be dispensed with, if desired, and the stock may be transferred and reversed by hand, but this would necessitate the employment of another hand. I may substitute rollers in place of the plates or guides D to the chain-holders, to lessen the friction. X represents the driving-shaft, which turns the vertical shafts $y$ by the worm-wheels $a$, and said shafts gear with the shafts $b$ of the upper chain-holder pulleys B, and turn them, and the said upper chain-pulleys turn the lower ones by friction, and the carrier-pulleys are turned by the belts which work over the chain-pulleys.

Having thus described my invention, I claim as new and desire to secure by Letters Patent—

1. The combination described of rolls B, endless chain-holders A, and guides D to hold the stock in position while the projecting portion is combed.

2. The combination of two endless feed-belts, I J, the belt I passing between rolls B, but the belt J passing over a roll, K, to cause a part of the stock to project over the side of holders in the manner set forth.

3. The vertical pulleys Q, belts O P, and horizontal pulleys R Z, combined to receive and reverse the stock in the manner specified.

GEORGE WILLETT.

Witnesses:
  T. B. MOSHER,
  C. SEDGWICK.